United States Patent
Dancsik

[11] 3,763,531
[45] Oct. 9, 1973

[54] TOOL HOLDER

[76] Inventor: Joseph J. Dancsik, 23550 Oneida, Oak Park, Mich.

[22] Filed: June 7, 1971

[21] Appl. No.: 150,489

[52] U.S. Cl. .................. 29/80 R, 29/76 A, 29/78, 51/170 TL
[51] Int. Cl... B23d 67/00, B23d 71/00, B23d 71/04
[58] Field of Search .................. 29/76, 76 A, 78, 29/80; 51/170 TL

[56] References Cited
UNITED STATES PATENTS

| | | | |
|---|---|---|---|
| 1,742,862 | 1/1930 | Jones | 29/76 R X |
| 1,173,164 | 2/1916 | Berkman | 29/80 |
| 1,347,933 | 7/1920 | Brix | 29/80 |
| 2,114,994 | 4/1938 | Brickner | 29/76 R |
| 950,792 | 3/1910 | Korinek | 29/76 R |
| 3,007,230 | 11/1961 | Riedl | 29/76 R |
| 2,197,626 | 4/1940 | Von Scheven | 51/170 TL |

Primary Examiner—Harrison L. Hinson
Attorney—McGlynn, Reising, Milton & Ethington

[57] ABSTRACT

A tool holder assembly of the type for attachment to a powered device having a handle portion into which rotating motion is inserted and a tool support neck extending laterally therefrom and which includes a reciprocating connector for reciprocating the tool holder. The tool holder is adapted to clamp an elongated tool, the inward end of which may be disposed anywhere between the tool holder and a position adjacent the handle portion of the powered device. The tool holder includes an L shaped member with a cradle movably supported on the L shaped member by an adjustment means which moves the bottom of the cradle toward and away from the bottom of the L shaped member for clamping a tool therebetween.

7 Claims, 3 Drawing Figures

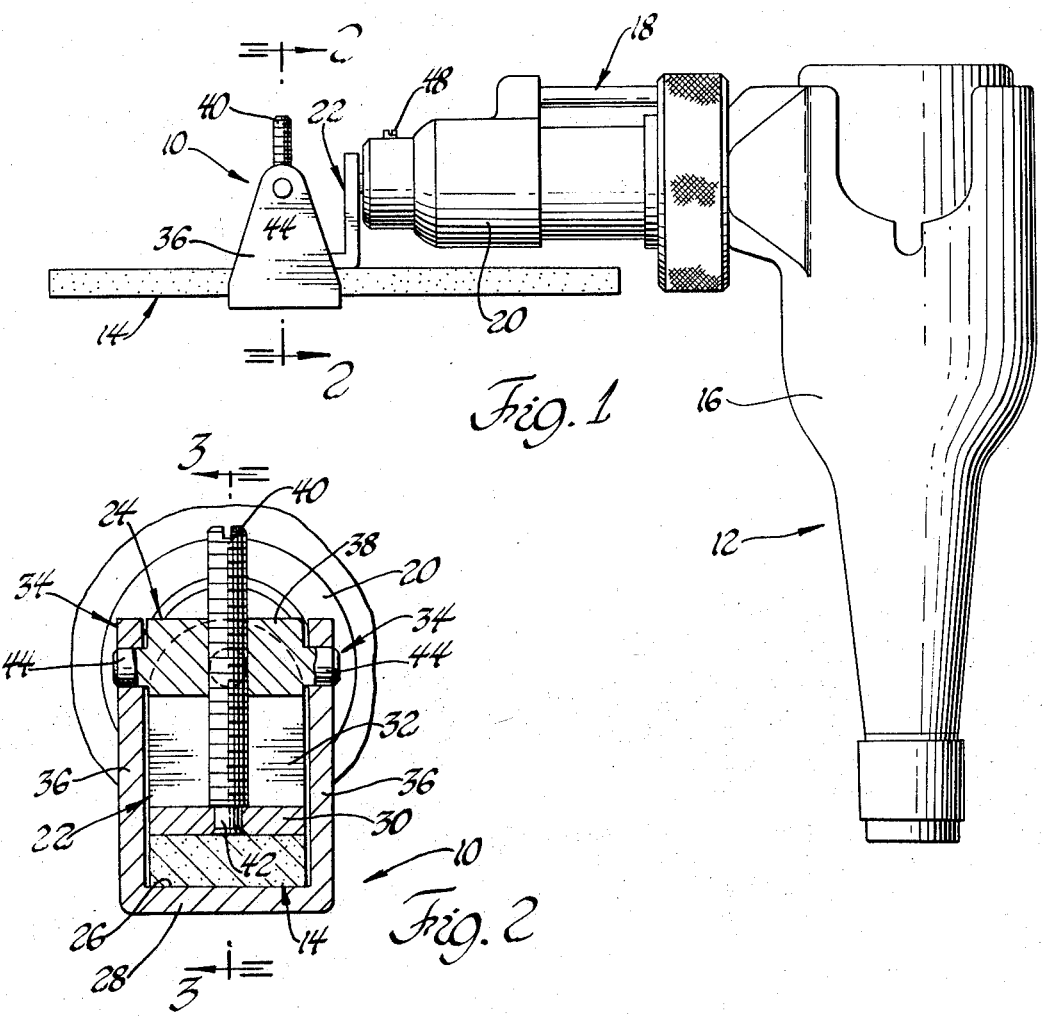
Fig. 1
Fig. 2
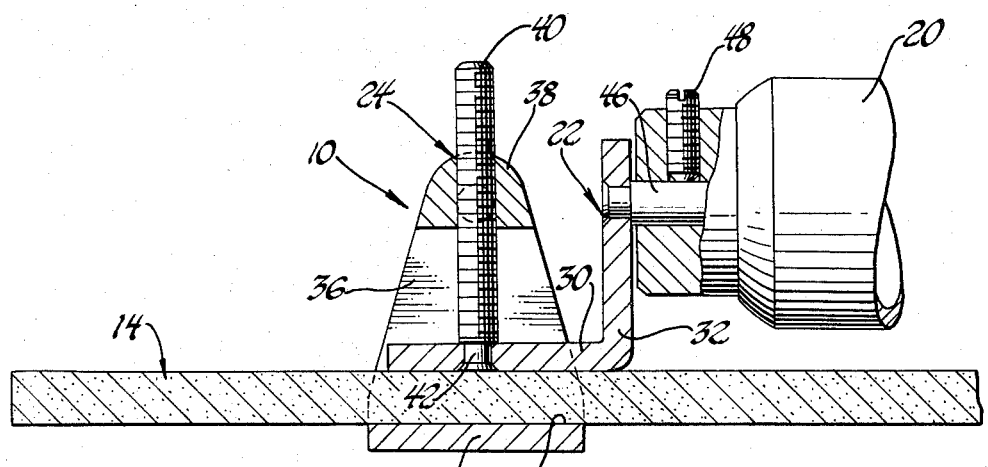
Fig. 3
INVENTOR.
Joseph J. Dancsik

TOOL HOLDER

This invention relates to a tool holder of the type attached to a powered device which reciprocates the tool holder by converting rotary motion to reciprocating motion.

More specifically, the makers of dies or molds which are utilized for the injection molding of plastic parts, or the like, utilize various tools for finishing such dies and molds. These tools are normally reciprocated by powered devices which convert rotary motion to reciprocating motion. Examples of such powered devices are illustrated in U.S. Pat. Nos. 2,690,081 and 3,007,230 and applicant's co-pending application Ser. No. 854,372 filed Sept. 2, 1969 now U.S. Pat. No. 3,626,768. The tool holders of the type to which the instant invention pertains are used to support tools which are in turn reciprocated to define precise surfaces in the molds or dies. A tool may be an appropriate abrasive or cutting tool which is supported by the tool holder which is in turn attached to the powered device which reciprocates the tool holder and the tool for finishing dies or molds and the like.

The powered devices which convert rotary motion to reciprocating motion normally include a handle or body portion with a tool supporting neck extending laterally therefrom, that is they are generally the shape of a hand gun or pistol.

Tool holders are known in the prior art for attachment to the reciprocating connector on the neck portion of the powered device but such tool holders have proven unsatisfactory in supporting certain tools. By way of example, an elongated abrasive tool made of a compacted brittle material is utilized in finishing dies and molds, but known tool holders require that such a brittle tool, which is 3 to 4 inches long when new, extend in a cantilevered fashion from the tool holder whereby the tool is easily and frequently broken.

Accordingly, it is an object and feature of this invention to provide a tool holder having a support means adapted to be attached to a powered device for reciprocation thereby and a clamping means operatively connected to the support means for clamping an elongated tool on an axis which is unobstructed by any portion of the assembly and extends longitudinally through the tool whereby only a short portion of the tool need extend from the tool holder and the tool may be moved forward in the tool holder as it wears, thereby eliminating the long cantilevered portion of the tool which is very susceptible to breakage.

Other objects and attendant advantages of the present invention will be readily appreciated as the same becomes better understood by reference to the following detailed description when considered in connection with the accompanying drawings wherein;

FIG. 1 is an elevational view showing the tool holder of the instant invention supporting a tool and attached to a powered device for reciprocating the tool holder;

FIG. 2 is an enlarged fragmentary cross sectional view taken substantially along line 2—2 of FIG. 1; and FIG. 3 is a fragmentary cross sectional view taken substantially along line 3—3 of FIG. 2.

Referring now to the drawings, a tool holder assembly constructed in accordance with the instant invention is generally shown at 10. A powered device for converting rotary motion to reciprocating motion for reciprocating the tool holder assembly is generally indicated at 12. A tool, which is supported by the tool holder assembly, is generally indicated at 14. The tool 14 is an abrasive tool of the wet stohe type which is formed of compacted abrasive material which is very brittle. The tool 14 is generally rectangular in configuration and is elongated.

The powered device 12 again is of the type described above and includes a handle portion 16 and a tool support neck generally indicated at 18. The tool support neck 18 extends laterally from the handle portion 16 adjacent the top thereof, the axis of the handle portion and the neck portion being generally perpendicular to one another. The neck portion includes a reciprocating connector 20 which is attached to the tool holder for reciprocating the tool holder.

The tool holder assembly 10 includes a support means generally indicated at 22 adapted to be attached to the reciprocating connector 20 of the powered device 12. The tool holder assembly also includes a clamping means generally indicated at 24 and oppositely connected to the support means 22 for clamping the elongated tool 14 on an axis which is unobstructed by any portion of the tool holder assembly and which axis extends longitudinally through the tool 14. In other words, the tool 14 may be disposed in the tool holder assembly 10 and any axis passing longitudinally through the tool 14 is unobstructed by any portion of the tool holder assembly 10 whereby a tool of infinite length may be supported in the tool holder assembly 10 when the tool holder assembly 10 is unattached to the powered device 12. Said another way, the inward end of the tool 14 may be disposed anywhere between the outward distal end of the neck 18, which is represented by the connector 20, and a position adjacent to handle portion 16 of the powered device 12.

The clamping means 24 includes a clamping surface 26 defined by a clamping plate 28. Clamping means 24 also includes adjustment means for moving the clamping surface 26 toward and away from the support means 22. The clamping surface 26 is disposed on one side of a plane and all of the support means 22 is disposed on the opposite side of the plane whereby the elongated tool 14 of infinite length may be clamped between the clamping surface 26 and the support means 22.

The support means 22 includes a generally L shaped member having a bottom leg 30 and upstanding leg 32. The adjustment means is connected to the L shaped member so as to move the clamping surface 26 toward and away from the bottom leg 30 of the L shaped member. The adjustment means includes a pivot means generally indicated at 34 in FIG. 2 for allowing the plane of the clamping surface 26 to be disposed at an angle other than 180° relative to the plane of the bottom leg 30 of the L shaped member. The adjustment means also includes a pair of spaced parallel side plates 36 which extend upwardly from opposite sides of the clamping plate 28 to define a generally U shaped cradle.

The adjustment means further includes a spider member 38 which is connected to the side plates 36 by the pivot means 34. The adjustment means also includes a threaded shaft 40 rotatably connected to the bottom leg 30 as indicated at 42. The threaded shaft 40 threadedly engages the spider member 38 for moving the spinder member 38 relative to the bottom leg 30 of the L shaped member so as to move the clamping plate 28 toward and away from the bottom leg 30 of the L shaped member.

The pivot means 34 comprise stub shafts 44 which extend from the ends of the spider member 38 and through holes in the adjacent side plates 36.

The support means 22 further includes a rod 46 fixedly secured to the upstanding leg 32 of the L shaped member so as to extend from the upstanding leg 32 in a direction opposite to the bottom leg 30 of the L shaped member. In other words, the rod 46 does not rotate relative to the upstanding leg 32 and is generally parallel to but extends in the opposite direction to the bottom leg 30. The rod 46 is secured in the reciprocating connector 20 by an Allan's screw 48 which prevents the rod 46 from rotating relative to the connector 20.

As will be appreciated from the foregoing description, an elongated tool 14 may be disposed in the tool assembly 10 in any position longitudinally along the tool 14 so that any desired length of the tool 14 may extend forwardly of the tool holder assembly 10 and whereby the opposite or inward end of the tool 14 may be disposed adjacent the handle portion 16 of the powered device 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A tool holder assembly comprising; a generally L-shaped member having an upstanding leg adapted to be attached to a powered device and a bottom leg extending from said upstanding leg, a clamping surface, and adjustment means connected to said bottom leg for moving said clamping surface toward and away from said bottom leg of said L-shaped member, said clamping surface being disposed beneath said bottom leg of said L-shaped member whereby an elongated tool of infinite length may be clamped between said clamping surface and said bottom leg of said L-shaped member.

2. An assembly as set forth in claim 1 wherein said clamping surface is defined by a clamping plate and said adjustment means includes a pivot means for allowing the plane of said clamping surface to be disposed at an angle other than 180° relative to the plane of the bottom leg of said L shaped member.

3. An assembly as set forth in claim 2 wherein said adjustment means includes a pair of spaced parallel side plates extending upwardly from opposite sides of said clamping plate to define a cradle.

4. An assembly as set forth in claim 3 wherein said adjustment means further includes a spider member connected to said side plates by said pivot means.

5. An assembly as set forth in claim 4 wherein said adjustment means also includes a threaded shaft rotatably connected to said bottom leg of said L shaped member and threadedly engaging said spider member for moving said spider member relative to said bottom leg of said L shaped member thereby to move said clamping plate toward and away from said bottom leg of said L shaped member.

6. An assembly as set forth in claim 5 wherein said pivot means comprises a stub shaft extending from each end of said spider member and through a hole in the adjacent side plate.

7. An assembly as set forth in claim 6 wherein said support means further includes a rod extending from the upstanding leg of said L shaped member and in a direction opposite to said bottom leg of said L shaped member.

* * * * *